(12) United States Patent
Aoki et al.

(10) Patent No.: US 7,548,956 B1
(45) Date of Patent: Jun. 16, 2009

(54) SPAM CONTROL BASED ON SENDER ACCOUNT CHARACTERISTICS

(75) Inventors: Norihiro Edwin Aoki, Synnyvale, CA (US); Shai Itzhak Bentov, Sunnyvale, CA (US)

(73) Assignee: AOL LLC, Dulles, VA (US)

( * ) Notice: Subject to any disclaimer, the term of this patent is extended or adjusted under 35 U.S.C. 154(b) by 1036 days.

(21) Appl. No.: 10/747,264

(22) Filed: Dec. 30, 2003

(51) Int. Cl.
*G06F 15/16* (2006.01)

(52) U.S. Cl. .................. 709/207; 709/204; 709/205; 709/206

(58) Field of Classification Search .......... 709/204–207
See application file for complete search history.

(56) References Cited

U.S. PATENT DOCUMENTS

| | | | |
|---|---|---|---|
| 5,548,533 A | 8/1996 | Gao | |
| 5,634,040 A | 5/1997 | Her | |
| 5,704,047 A | 12/1997 | Schneeberger | |
| 5,742,587 A | 4/1998 | Zornig | |
| 5,862,325 A | 1/1999 | Reed | |
| 5,999,932 A | 12/1999 | Paul | |
| 6,044,260 A | 3/2000 | Eaton | |
| 6,052,709 A | 4/2000 | Paul | |
| 6,072,942 A | 6/2000 | Stockwell | |
| 6,088,736 A | 7/2000 | Manning | |
| 6,092,115 A | 7/2000 | Choudhury | |
| 6,105,012 A | 8/2000 | Chang et al. | |
| 6,161,130 A * | 12/2000 | Horvitz et al. | 709/206 |
| 6,167,029 A | 12/2000 | Ramakrishnan | |
| 6,167,434 A | 12/2000 | Pang | |
| 6,199,103 B1 | 3/2001 | Sakaguchi et al. | |
| 6,205,551 B1 | 3/2001 | Grosse | |
| 6,266,664 B1 | 7/2001 | Russell-Falla | |
| 6,321,267 B1 | 11/2001 | Donaldson | |
| 6,330,590 B1 | 12/2001 | Cotten | |
| 6,360,254 B1 | 3/2002 | Linden et al. | |
| 6,421,709 B1 | 7/2002 | McCormick et al. | |
| 6,507,866 B1 | 1/2003 | Barchi | |
| 6,580,790 B1 | 6/2003 | Henry | |
| 6,591,301 B1 | 7/2003 | Li | |
| 6,615,241 B1 | 9/2003 | Miller | |
| 6,643,685 B1 | 11/2003 | Millard | |

(Continued)

FOREIGN PATENT DOCUMENTS

WO    WO 99/03238    1/1999

OTHER PUBLICATIONS

Eric Allman, *Sendmail™ Installation and Operation Guide Version 8.310 for Sendmail Version 8.10*, Sendmail, Inc., (84 pages).

(Continued)

*Primary Examiner*—Kenny S Lin
*Assistant Examiner*—Hieu T Hoang
(74) *Attorney, Agent, or Firm*—Fish & Richardson P.C.

(57) ABSTRACT

The characteristics of a communications account are used to determine whether the account is being used by a spammer. When the account is being used by a spammer, the use of the account for outgoing communications is limited to help prevent spam from being sent from the account. For example, communications from the account can be blocked, messages from the account may be delivered to a spam folder at the recipient (rather than an "inbox"), or outgoing messages from the account may be rate-limited.

80 Claims, 7 Drawing Sheets

U.S. PATENT DOCUMENTS

| | | | |
|---|---|---|---|
| 6,643,686 | B1 | 11/2003 | Hall |
| 6,654,787 | B1 | 11/2003 | Aronson |
| 6,678,835 | B1* | 1/2004 | Shah et al. ............... 714/4 |
| 6,691,156 | B1 | 2/2004 | Drummond |
| 6,701,522 | B1 | 3/2004 | Rubin |
| 6,732,149 | B1* | 5/2004 | Kephart ............... 709/206 |
| 6,748,422 | B2 | 6/2004 | Morin |
| 6,829,635 | B1 | 12/2004 | Townshend |
| 6,868,498 | B1 | 3/2005 | Katsikas |
| 6,928,465 | B2* | 8/2005 | Earnest ............... 709/206 |
| 7,103,599 | B2 | 9/2006 | Buford |
| 7,155,608 | B1* | 12/2006 | Malik et al. ............ 713/170 |
| 7,293,063 | B1* | 11/2007 | Sobel ............... 709/206 |
| 2002/0059454 | A1 | 5/2002 | Barrett |
| 2002/0116463 | A1 | 8/2002 | Hart |
| 2002/0116641 | A1 | 8/2002 | Mastrianni |
| 2002/0181703 | A1 | 12/2002 | Logan et al. |
| 2002/0199095 | A1 | 12/2002 | Bandini et al. |
| 2003/0149726 | A1* | 8/2003 | Spear ............... 709/206 |
| 2003/0167402 | A1 | 9/2003 | Stolfo |
| 2003/0229672 | A1* | 12/2003 | Kohn ............... 709/207 |
| 2003/0236845 | A1* | 12/2003 | Pitsos ............... 709/206 |
| 2004/0015554 | A1* | 1/2004 | Wilson ............... 709/206 |
| 2004/0064515 | A1 | 4/2004 | Hockey |
| 2004/0073617 | A1* | 4/2004 | Milliken et al. ........... 709/206 |
| 2004/0083270 | A1 | 4/2004 | Heckerman |
| 2004/0093384 | A1* | 5/2004 | Shipp ............... 709/206 |
| 2004/0122803 | A1* | 6/2004 | Dom et al. ............... 707/3 |
| 2004/0128355 | A1* | 7/2004 | Chao et al. ............ 709/206 |
| 2004/0139160 | A1* | 7/2004 | Wallace et al. ............ 709/206 |
| 2004/0139165 | A1* | 7/2004 | McMillan et al. ............ 709/206 |
| 2004/0177120 | A1* | 9/2004 | Kirsch ............... 709/206 |
| 2004/0205135 | A1* | 10/2004 | Hallam-Baker ............ 709/206 |
| 2004/0210640 | A1* | 10/2004 | Chadwick et al. ........... 709/207 |
| 2004/0260776 | A1* | 12/2004 | Starbuck et al. ............ 709/206 |
| 2004/0260778 | A1* | 12/2004 | Banister et al. ............ 709/206 |
| 2004/0267625 | A1* | 12/2004 | Feng et al. ............... 705/26 |
| 2005/0021649 | A1* | 1/2005 | Goodman et al. ............ 709/207 |
| 2005/0033810 | A1* | 2/2005 | Malcolm ............... 709/206 |
| 2005/0055404 | A1* | 3/2005 | Kitchen, Jr. ............... 709/206 |
| 2005/0080860 | A1* | 4/2005 | Daniell et al. ............... 709/206 |
| 2005/0091319 | A1* | 4/2005 | Kirsch ............... 709/206 |
| 2005/0102366 | A1* | 5/2005 | Kirsch ............... 709/207 |
| 2005/0114452 | A1* | 5/2005 | Prakash ............... 709/206 |
| 2005/0120019 | A1* | 6/2005 | Rigoutsos et al. ............ 707/6 |

OTHER PUBLICATIONS

*Allowing controlled SMTP relaying in Sendmail 8.9*, (2 pages), http://web.archive.org/web/20000510213022/www.sendmail.org/tips/relaying.html.
*Anti-Spam Configuration Control*, (5 pages), http://web.archive.org/web/20000520064211/www.sendmail.org/m4/anti-spam.html.
*Anti-Spam Provisions in Sendmail 8.8*, (4 pages), http://web.archive.org/web/20000510040556/www.sendmail.org/antispam.html.
Mark Durham, *Spam Control in 8.10*, (3 pages), http://web.archive.org/web/20000618042433/sendmail.net/?feed=interview810-5.
Paul Boutin, *RFC 2476: Message Submission Agent*, (3 pages), http://web.archive.org/web/20001027060210s/sendmail.net/?feed=rfc2476.
Paul Boutin, *RFC 2554: SMTP Authentication*, (4 pages), http://web.archive.org/web/20001016141928/sendmail.net/?feed=rfc2554.
*Relaying Denied/Allowed (in sendmail 8.8/8.9)*, Last Update Feb. 11, 2000, (2 pages), http://web.archive.org/web/20000418000700/www.sendmail.org/~ca/email/relayingdenied...,.
rfc2222, J. Myers, *Simple Authentication and Security Layer (SASL)*, (16 pages), Oct. 1997, The Internet Society (1997), http://web.archive.org/web/20001027153713/www.cis.ohio-state.edu/htbin/rfc/rfc2222.ht...,.
rfc2554, J. Myers, *SMTP Service Extension for Authentication*, (11 pages), Mar. 1999, The Internet Society (1999), http://web.archive.org/web/20001018181229/www.cis.ohio-state.edu/htbin/rfc/rfc2554.ht...,.
*Using SMTP Auth in Sendmail 8.10*, (2 pages), Mar. 27, 2000, http://web.archive.org/web/20001016174022/sendmail.net/?feed=usingsmthpauth.
Godfrey, J., "Instant Spam: It's Tough to Swallow," *Home Office Computing*, [online] vol. 16, No. 11, p. 24 [retrieved on Dec. 29, 2004]. Retrieved from <URL: http://proquest.umi.com/pdqweb?index=21&sid=2&srchmode=1&vinst=PROD&fmt=4&startpage...>.
U.S. Appl. No. 09/749,630.
R. Hall, "A Countermeasure to Duplicate-detecting Anti-spam Techniques", AT&T Labs Technical Report 99.9.1, 1999.
A. Kolcz and J. Alspector, "SVM-based Filtering of E-mail Spam with Content-specific Misclassification Costs," *TextDM'2001 (IEEE ICDM-2001 Workshop on Text Mining)*, San Jose, CA, 2001.
M. Marvin, "Announce: Implementation of E-mail Spam Proposal", news.admin.net-abuse.misc, Aug. 3, 1996.
S. Hird, "Technical Solutions for Controlling Spam in the proceedings of AUUG2002", Melbourne, Sep. 4-6, 2002.
M. Hearst et al., "Support Vector Machines", IEEE Intelligent Systems, Jul./Aug. 1998.
H. Drucker et al., "Support Vector Machines for Spam Categorization", IEEE Transactions on Neural Networks, vol. 10, No. 5, Sep. 1999.
"Learning to Filter Spam E-Mail: A Comparison of a Naïve Bayesian and a Memory-Based Approach," 4th European Conference on Principles and Practice of Knowledge Discovery in Databases (PKDD-2000), H. Zaragoza, P. Gallinari and M. Jarman (Eds.), Lyon, France, Sep. 2000, pp. 1-12.
T. Joachims, Text Categorization with Support Vector Machines: Learning with Many Relevant Features, University of Dortmund, Computer Science Dept., LS-8 Report 23, 1998.
J. Dudley, "Telstra targets Net spammers", news.com.au, Dec. 2, 2003.
Bart Massey et al.; "Learning Spam: Simple Techniques For Freely-Available Software", Computer Science Dept., Portland, OR USA, 2003, pp. 1-14.
http://www.paulgraham.com/better.html, "Better Bayesian Filtering", Jan. 2003 pp. 1-11.
http://www.palimine.net/qmail/tarpit.html, "Tarpitting with qmail-smtpd", p. 1.
Dale Woolridge et al., "qmail-spamthrottle (5)—the spam throttle mechanism", http://spamthrottle.qmail.ca/man/qmail-spamthrottle.5.html, pp. 1-4.
Office Action issued in U.S. Appl. No. 10/746,231 mailed Apr. 9, 2008, 29 pages.

* cited by examiner

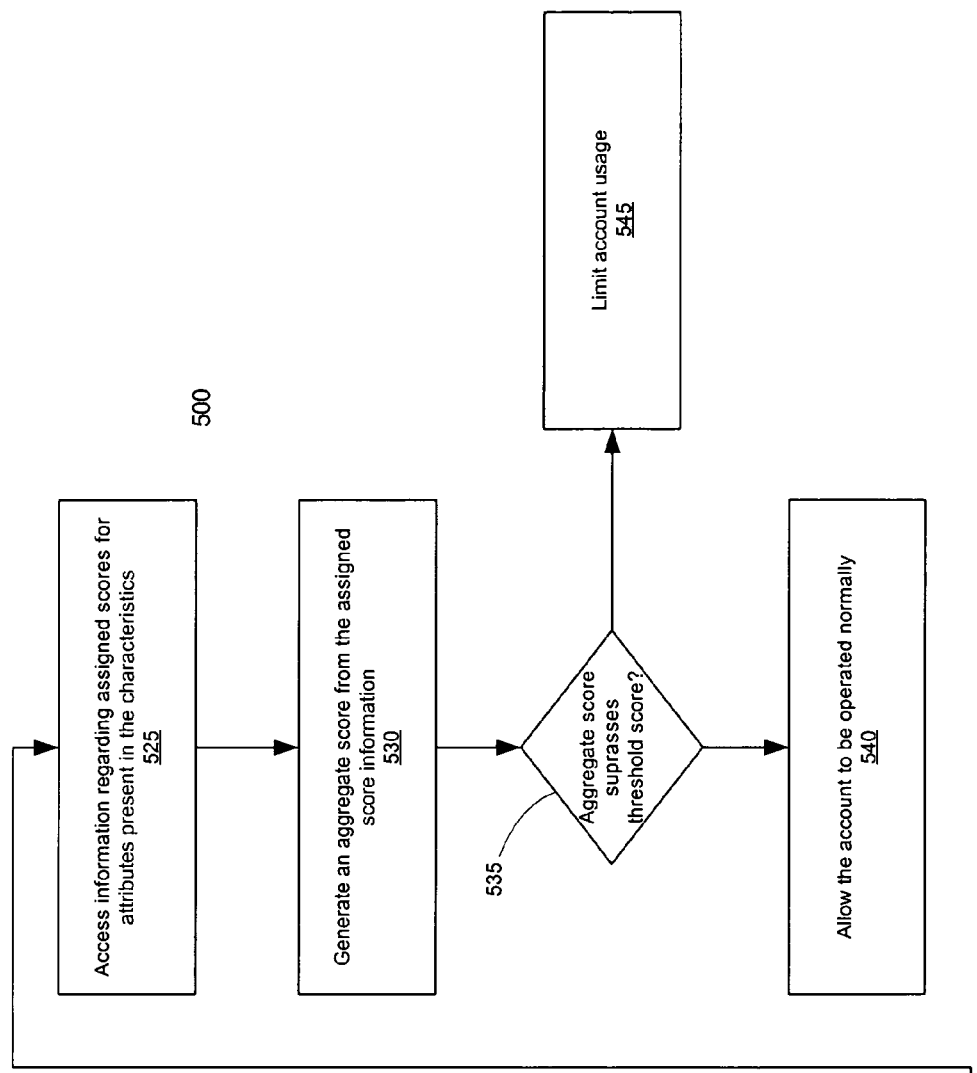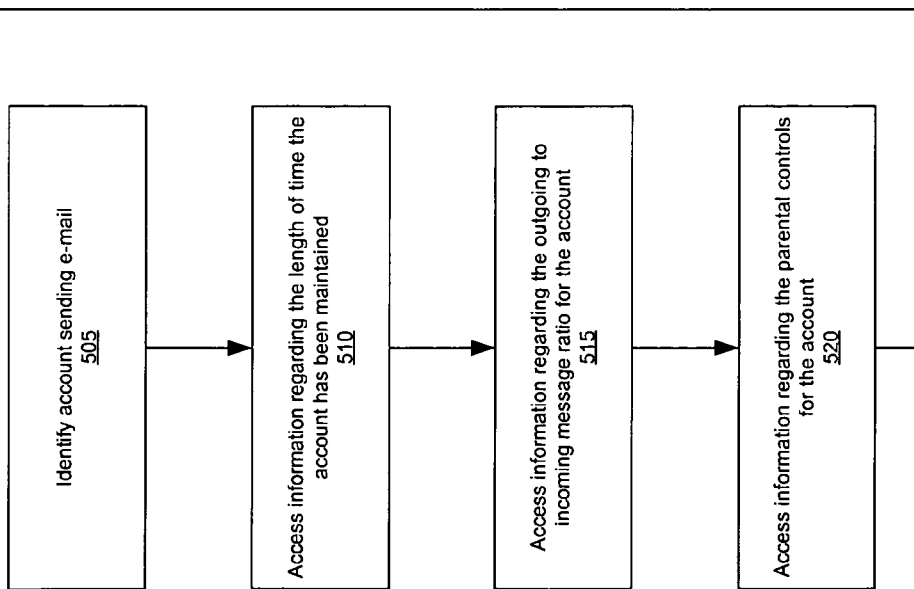
Figure 5

SPAM CONTROL BASED ON SENDER ACCOUNT CHARACTERISTICS

TECHNICAL FIELD

This description relates to spam filtering.

BACKGROUND

With the advent of the Internet and a decline in computer prices, many people are communicating with one another through computers interconnected by networks. A number of different communication mediums (e.g., electronic mail (e-mail) and instant messaging (IM)) have been developed to facilitate such communications between computer users.

Unfortunately, because the costs of sending messages using these mediums are relatively low, computer users are being subjected to mass, unsolicted, commercial communications (colloquially known as spam). Those who send spam are typically referred to as spammers. Spam impacts both users and communication service providers. For users, spam can be disruptive, annoying, and time consuming. For a service provider, spam represents tangible costs in terms of storage and bandwidth usage. These costs may be substantial when large numbers of spam are sent.

SUMMARY

In on aspect, techniques for controlling the usage of a communications account are described. Characteristics of a communications account are accessed. The characteristics include characteristics that indicate the communications account is being operated by a spammer and characteristics that indicate the account is not being operated by a spammer. An aggregate measure that indicates the likelihood that the account is being used by a spammer is determined based on the characteristics that indicate the communications account is being operated by a spammer and characteristics that indicate the account is not being operated by a spammer such that the characteristics that indicate the communications account is being operated by a spammer and characteristics that indicate the account is not being operated by a spammer offset each other when used to determine the aggregate measure. Whether the account is being operated by a spammer based on the aggregate measure is determined; and the use of the communications account for outgoing communications is limited when the account is determined to be operated by a spammer.

Implementations of this aspect may have one or more of the following features. For example, the characteristics may include a length of time the communications account has been maintained; a ratio of communications sent from the communications account to communications received by the communications account; whether a message has been posted to a message board by the communications account; whether there are ratings associated with the communications account; whether parental controls exist for the communications account; whether communications have been sent to the communications account by an intended recipient; and/or whether an intended recipient has the communications account in a contact list;

Determining whether the account is being operated by a spammer may include comparing the aggregate measure to at least one threshold measure to determine whether the characteristics of the account indicate that the account is being operated by a spammer. A first and second threshold measure may be used and the aggregate measure may be compared to the first threshold measure to determine whether the aggregate measure surpasses the first threshold measure and compared to the second threshold measure to determine if the aggregate measure surpasses the second threshold measure. The use of the communications account for outgoing communications may be limited differently based on whether the aggregate measure surpasses the first threshold or the second threshold.

Limiting the use of the communications account may include deleting or blocking the message from delivery to an intended recipient of the message; delivering the message to a folder other than an inbox folder of the intended recipient; placing a rate limit on the account that prevents more than a certain number of messages from being sent from the account in a specified period of time; the continued enforcement of limitations previously placed on the communications account; increasing the time required to send a communication; and/or distinguishing communications delivered to an intended recipient from the communications account. The limitations previously placed on the communications account may include a rate limit placed on the communications account. The rate limit may be relaxed when the account is determined to not be operated by a spammer. More generally, the limitations previously placed on the communications account may be relaxed when the account is determined to not be operated by a spammer.

The communications may be e-mails, instant messages, SMS messages, or MMS messages.

In another aspect, characteristics of a communications account are accessed. The characteristics include characteristics that indicate the communications account is being operated by a spammer and characteristics that indicate the account is not being operated by a spammer. Whether the account is being operated by a spammer is determined based on the characteristics. Determining whether the account is being operated by a spammer includes discounting the characteristics that indicate the account is being operated by a spammer with the characteristics that indicate the account is not being operated by a spammer or discounting the characteristics that indicate the account is not being operated by a spammer with the characteristics that indicate the account is being operated by a spammer. The use of the communications account for outgoing communications is limited when the account is determined to be operated by a spammer.

Implementations of this aspect may have one or more of the following features. For example, the characteristics may include a length of time the communications account has been maintained; a ratio of communications sent from the communications account to communications received by the communications account; whether a message has been posted to a message board by the communications account; whether there are ratings associated with the communications account; whether parental controls exist for the communications account; whether communications have been sent to the communications account by an intended recipient; and/or whether an intended recipient has the communications account in a contact list;

Determining whether the account is being operated by a spammer based on the characteristics may include allocating scores to certain attributes in the characteristics; detecting which attributes are present in the characteristics; forming an aggregate score based on the assigned scores and the attributes present in the characteristics such that the characteristics that indicate the account is being operated by a spammer are discounted by the characteristics that indicate the account is not being operated by a spammer, wherein the aggregate score is indicative of the likelihood that the account is being operated by a spammer; and comparing the aggregate score to at least one threshold score to determine whether the characteristics of the account indicate that the account is being operated by a spammer.

A first and second threshold score may be used and the aggregate measure may be compared to the first threshold measure to determine whether the aggregate measure surpasses the first threshold score and compared to the second threshold score to determine if the aggregate measure surpasses the second threshold score. The use of the communications account for outgoing communications may be limited differently based on whether the aggregate measure surpasses the first threshold or the second threshold.

Determining whether the account is being operated by a spammer based on the characteristics may include inputting the characteristics or data indicative of the existence of certain attributes in the characteristics into a spam filter to be considered as features of a message from the account.

Limiting the use of the communications account may include deleting or blocking the message from delivery to an intended recipient of the message; delivering the message to a folder other than an inbox folder of the intended recipient; placing a rate limit on the account that prevents more than a certain number of messages from being sent from the account in a specified period of time; the continued enforcement of limitations previously placed on the communications account; increasing the time required to send a communication; and/or distinguishing communications delivered to an intended recipient from the communications account. The limitations previously placed on the communications account may include a rate limit placed on the communications account. The rate limit may be relaxed when the account is determined to not be operated by a spammer. More generally, the limitations previously placed on the communications account may be relaxed when the account is determined to not be operated by a spammer.

The communications may be e-mails, instant messages, SMS messages, or MMS messages.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 5 is a flowchart showing an exemplary implementation in which scores are assigned to attributes in characteristics of a communications account.

DETAILED DESCRIPTION

When the characteristics of an account indicate it is being used by a spammer, the usage of the account to send outgoing communications can be limited in a number of ways to help prevent spam from being sent from the account. For example, communications from the account can be blocked, messages from the account may be delivered to a spam folder at the recipient (rather than an "inbox"), or outgoing messages from the account may be rate-limited.

Moreover and in general, characteristics of a communications account may be used to determine whether the account is being used by a spammer. When the account is being used by a spammer, the use of the account for outgoing communications may be limited.

The communications account may be, for example, an e-mail account, an IM account, a short messaging service (SMS) account, or a multimedia messaging service (MMS) account. Such accounts support outgoing communications, i.e., communications sent from the account user to other users. Spammers use the outgoing communications to send spam to other users. In doing so, however, spammers typically use such accounts differently than other types of users. For example, spammers typically send many more communications than they receive and use an account for only a short period of time. Because spammers use the accounts differently, the characteristics of an account can be used to determine whether the account is likely being used by a spammer.

Figure 1:
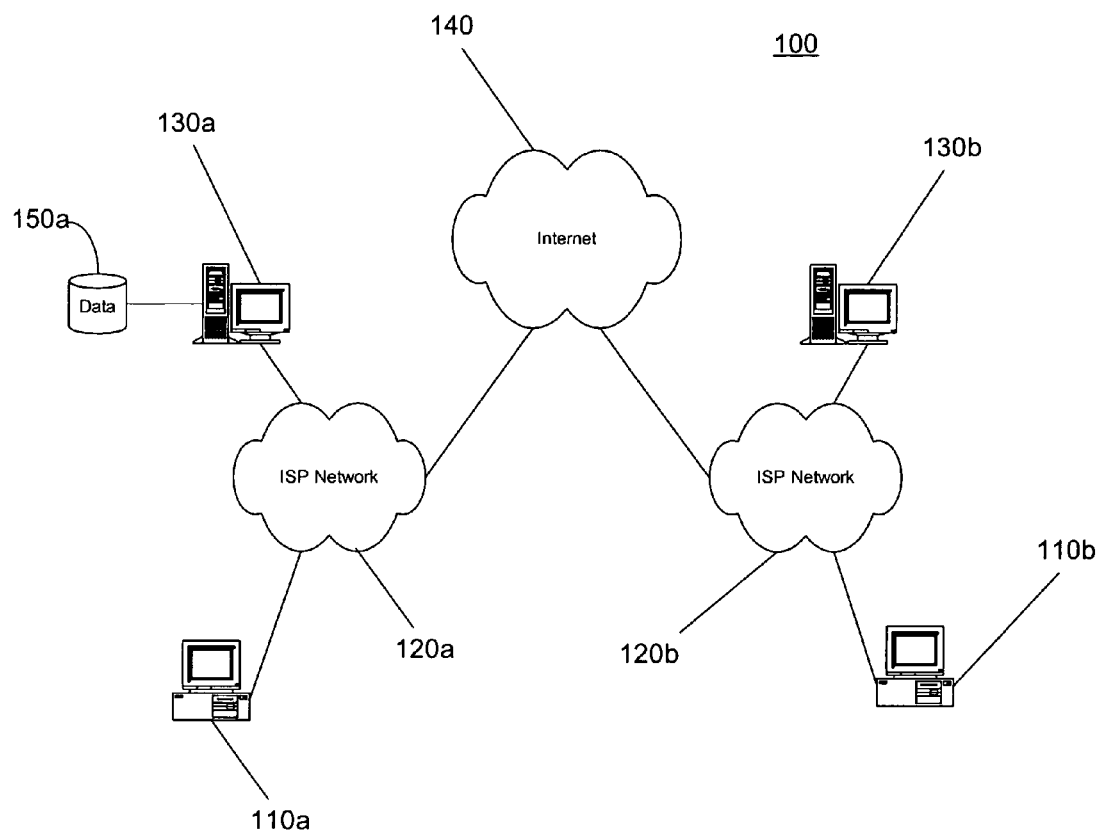
FIG. 1 is a diagram showing an exemplary networked computing environment that supports e-mail communications and in which techniques may be used to help prevent spam sent as e-mail.

FIG. 1 illustrates an exemplary networked computing environment 100 that supports e-mail communications and in which such techniques may be used to help prevent spam sent as e-mail or otherwise. Computer users are distributed geographically and communicate using client terminals 110a and 110b. Client terminals 110a and 110b are connected to ISP networks 120a and 120b, respectively. While illustrated as ISP networks, networks 120a or 120b may be any network, e.g. a corporate network. Client terminals 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. Connected to e-mail server 130a is a data store 150a (e.g., a database, a storage area network, another computer, or a network of multiple computers) that stores characteristic information (described below) for one or more e-mail accounts serviced by e-mail server 130a. Data store 150a may be connected directly to e-mail server 130a or indirectly, for example, through a network. Data store 150a may be connected to a different e-mail server, such as, for example, e-mail server 130b and e-mail server 130a may communicate with e-mail server 130b or directly with data store 208 to obtain the characteristic information. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client terminals may be connected to each ISP network.

Each of the client terminals 110a and 110b and e-mail servers 130a and 130b may be implemented using, for example, a general-purpose computer capable of responding to and executing instructions in a defined manner, a personal computer, a special-purpose computer, a workstation, a server, a portable device such as a personal digital assistant (PDA), a component, a cellular phone or other mobile device, or other equipment or some combination thereof capable of responding to and executing instructions. Client terminals 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client terminals 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client terminal 110a and 110b or the e-mail servers 130a and 130b.

Each of client terminals 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, e.g., a corporate LAN. Networks 120a and 120b may include multiple networks or subnetworks, each of which may include, for example, a wired or wireless data pathway.

Each of e-mail servers 130a and 130b may handle e-mail for thousands or more e-mail users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service for e-mail users of an ISP network.

An e-mail user, such as a user of client terminal 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client terminal 110a or 110b to retrieve the e-mail from e-mail server 130a, 130b and view the e-mail. The e-mail client program may be, for example, a stand-alone e-mail client (e.g., Microsoft Outlook), an integrated suite of communications applications (e.g., AOL Communicator), part of a client for a specific service provider (e.g., the America Online (AOL) client), or a web browser in the event the e-mail is web-based e-mail.

The e-mail client programs executing on client terminals 110a and 110b also may allow one of the users to send e-mail to an e-mail address. For example, the e-mail client program executing on client terminal 110a may allow the e-mail user of client terminal 110a (the sending user) to compose an e-mail message and address the message to a recipient address, such as an e-mail address of the user of client terminal 110b. When the sender indicates the e-mail is to be sent to the recipient address, the e-mail client program executing on client terminal 110a submits the e-mail to e-mail server 130a to handle the sending of the e-mail to the recipient address. For an e-mail addressed to an e-mail user of client terminal 110b, for example, e-mail server 130a sends the e-mail to e-mail server 130b through Internet 140. To get to e-mail server 130b, the e-mail may be relayed by one or more e-mail servers connected to Internet 140 until it is delivered to e-mail sever 130b. Once e-mail server 130b receives the e-mail, the e-mail is placed in the mailbox that corresponds to the recipient address. The user of client terminal 110b may then retrieve the e-mail from e-mail server 130b, as described above.

In an e-mail environment such as that shown, a spammer typically uses an e-mail client or server program to send spam e-mails to hundreds, if not thousands, of e-mail recipients. For example, a spammer may use one or more client terminals 110a, 110b to access e-mail accounts (spam accounts) on e-mail server 130a and to send an e-mail to hundreds of recipient e-mail addresses for delivery or display to users of e-mail accounts corresponding to the recipient e-mail addresses, generally using other of the client terminals 110a, 110b. The spammer may maintain the list of targeted recipient addresses as a distribution list that is stored remotely or at the client terminal 110a, 110b used to send the spam. The spammer may use an e-mail client or server program at or accessible to client terminal 110a, 110b to compose a spam e-mail and instruct the e-mail client or server program to use the distribution list to send the spam e-mail to the recipient addresses. The e-mail client program then logs on to e-mail server 130a and submits the e-mail with the recipient address to server 130a. The e-mail is then relayed to the e-mail server for each recipient address and delivered.

Figure 2:
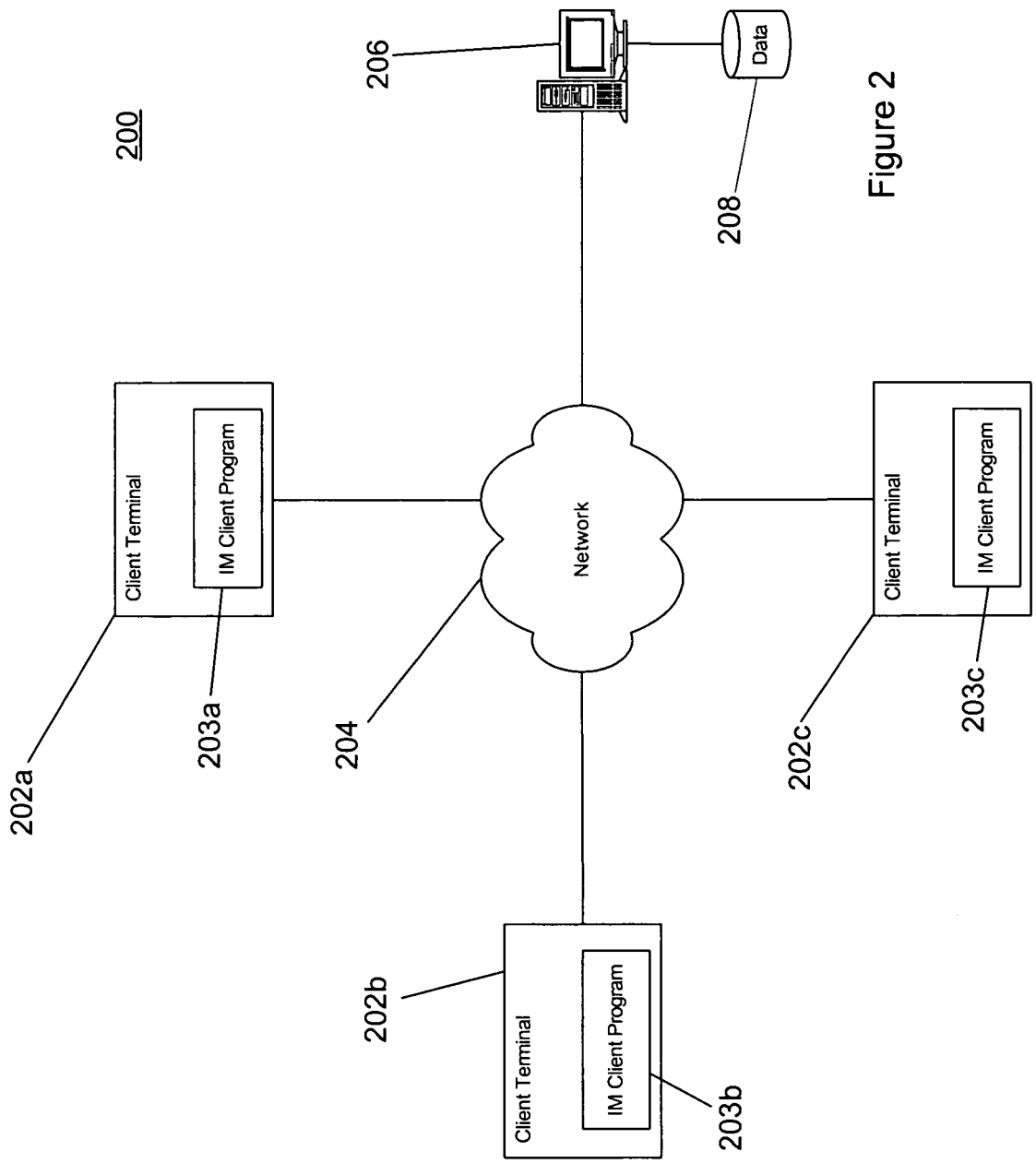
FIG. 2 is a diagram showing an exemplary networked computing environment that may support instant messaging communications and in which techniques may be used to help prevent spam sent as instant messages.

FIG. 2 illustrates an exemplary networked computing environment 200 that may support instant messaging communications and in which the above-described techniques may be used to help prevent spam sent as instant messages or otherwise. Client terminals 202 may be similar to client terminals 110a and 110b and instant messaging host server 206 may be similar to e-mail servers 130a and 130b.

A network 204 interconnects client terminals 202a-202c and IM host server 206. Examples of the network 104 are described with respect to FIG. 1 and may include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. The network 204 may include multiple networks or sub-networks, each of which may include, for example, a wired or wireless data pathway.

IM client programs 203a-203c executing on client terminals 202a-202c typically have a user interface that presents representations of a user's buddies (i.e., other users of the instant messaging program selected by the user) who are also running IM client programs 203a-203c on their respective client terminals 202a-202c. Buddies are normally represented by identifiers known as screen names. When a user's IM client program 203a-203c is connected to the network 204 and a buddy is available for communications, the buddy is shown to be "present" to the user, enabling the user to communicate or interact with the buddy (and other users) using the IM client program 203a-203c. For example, the user may select the screen name of a buddy to conveniently engage in a real-time messaging session with the buddy. An IM user also can engage in instant messaging sessions with screen names that are not buddies.

By way of a example, a first user may cause IM client program 203a to execute on client terminal 202a and to connect to network 204. Similarly, a second user may cause IM client program 203b to execute on client terminal 202b and to connect to network 204. If the second user is a buddy of the first user, the IM client program 203a will indicate to the first user that the second user is present (i.e., IM client program 203b is connected to network 204 and available for communications). The first user may then select the screen name of the second user, using IM client program 203a to initiate a real-time messaging session with the second user. Once the messaging session is initiated, the first and second users may communicate or interact with one another using IM client programs 203a and 203b, respectively.

Likewise, a third user may cause IM client program 203c to execute on client terminal 202c and to connect to network 204. If the third user is not selected as a buddy by the first user, the third user's screen name will not be displayed by IM client program 203a. However, if the first user nevertheless knows the screen name of the third user, the first user may input the third user's screen name into IM client program 203a to initiate a real-time messaging session with the third user. Once the messaging session is initiated, the first and thirds users may communicate or interact with one another using IM client programs 203a and 203c, respectively.

IM client programs 203a-203c may use an IM host server 206 to assist in communications between users. When a user is connected to the network 204 and executes the IM client program 203a-203c, the IM client program 203a-203c contacts the IM host server 206 and logs the user onto the IM host server 206. The IM host server 206 may inform the IM client program 203a-203c when the program user's buddies are online and may facilitate communications between the program user and a buddy. Thus, once logged on to the IM host server 206, a user may use the IM client program 203a-203c to view whether particular buddies are online, to exchange IMs with particular buddies, to participate in group chat rooms, or to trade files such as pictures, invitations or documents. The program user also may be able to find other buddies with similar interests, get customized information such as news and stock quotes, and search the World Wide Web.

IM host server 206 may support IM services irrespective of a program user's network or Internet access. Thus, IM host server 206 may allow users to send and receive IMs, regardless of whether they have access to any particular Internet service provider (ISP). IM host server 206 also may support associated services, such as administrative matters, advertising, directory services, chat, and interest groups related to IM. To transfer data, IM host server 206 employs one or more standard or proprietary IM protocols.

IM host server 206 may assist IM communications between users of IM client programs 203a-203c by facilitating the establishment of a peer-to-peer communication session between the IM client programs 203a-203c. Or the IM host server 206 may assist IM communications by directly routing communications between the IM client programs 203a-203c.

Connected to IM host server 206 is a data store 208 (e.g., a database, a storage area network, another computer, or a network of multiple computers) that stores characteristic information (described below) for one or more IM accounts serviced by IM host server 206. Data store 208 may be connected directly to IM host server 206 or indirectly, for example, through a network. Data store 208 may be connected to a different IM host server (not shown) and IM host server 208 may communicate with the other IM host server or directly with data store 208 to obtain the characteristic information.

Similar to the e-mail environment, a spammer may use one or more instant message accounts (spam accounts) to send an instant message to a large number of recipient screen names (i.e., identifiers of instant messaging users).

While communications environments supporting e-mail and IM communications have been illustrated, these communications environments, or similar environments, may support other types of communications or services in which the techniques described herein may be used. For example, mobile device networks (e.g., cellular phone networks) are increasingly experiencing spam sent as simple text messages using the SMS service or as multimedia messages using the MMS service. The described techniques also may be useful in preventing or reducing spam sent using these communications environments and services.

Figure 3:
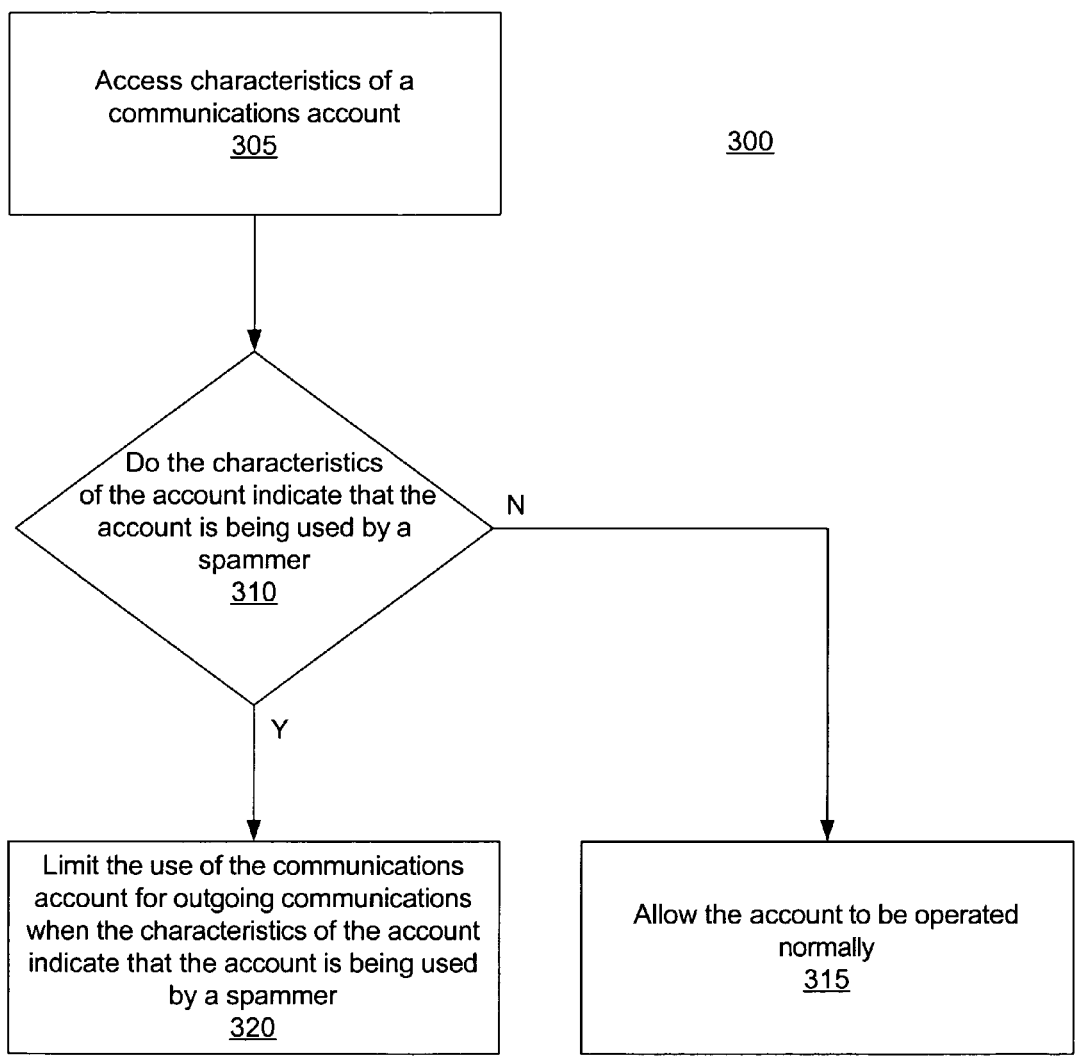
FIG. 3 is a flowchart of a method that may be performed by a communications server to limit the use of communications accounts for spamming.

FIG. 3 is a flowchart of a method 300 that may be performed by a communications server, such as e-mail server 130a or IM host server 206, to limit the use of communications accounts for spamming. Method 300 may be performed in two general contexts. First, method 300 may be performed to limit spam account usage by performing an action on a particular outgoing message (i.e., performing an action on some, but perhaps less than all outgoing messages such that all outgoing messages from the account are not subject to the same restrictions). For example, characteristics of the account may be used in a spam filter that evaluates outgoing messages from a number of communications accounts. In this case, when the spam filter is applied to a message, the characteristics of the account that sent the message may be part of a larger set of features of the message that are evaluated by the spam filter to determine if the message is spam. Thus, in an implementation such as this, a spam account is limited in the sense that some spam messages will be recognized as such and treated accordingly (e.g., deleted/blocked or sent to a spam folder instead of an inbox).

Second, method 300 may be performed to limit spam account usage by performing an action that affects the use of the account in general. For example, an account may be rate limited, i.e., only a certain number of outgoing messages may be sent from the account during a certain period of time. As another example, one action taken may be to slow down the transmission of a message to the server as it is being submitted, thereby increasing the amount of time it takes to send a message. These are limitations that affect the use of the account in general.

To determine whether the use of a communications account should be limited, the characteristics of a communications account are accessed (305). The characteristics are used to determine whether the communications account is likely being operated by a spammer (310). When the determination 310 indicates that the communications account is not likely being operated by a spammer, the account may be allowed to operate normally (315). When the determination (310) indicates that the communications account is likely being operated by a spammer, the usage of the account for outgoing messages is limited (320).

Figure 4A:
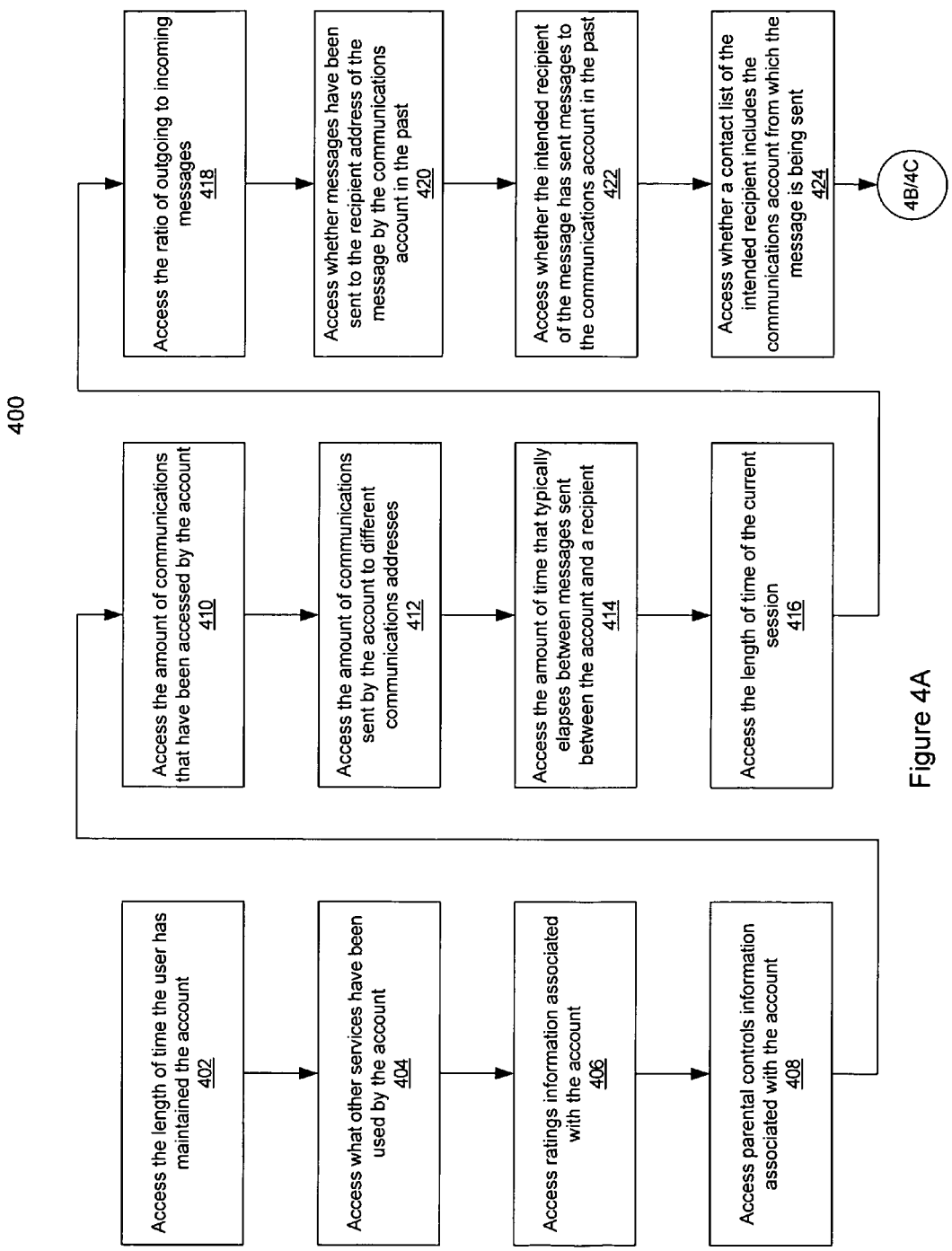
FIG. 4A is a flowcharts showing an implementation of step 305 in FIG. 3.

FIG. 4A is a flowchart showing an implementation of step 305 and illustrating the various characteristics that may be accessed. The characteristics stored and accessed may depend on the particular context in which method 300 is implemented, e.g., whether the limiting is applied by performing an action on a particular message or by an action that affects the use of the account in general. In addition, the characteristics may be accessed in a different order than that shown in FIG. 4A, or may be accessed simultaneously. The characteristics can be accessed when the user of the account logs onto the communications server using the account, when a message to be sent is submitted for distribution to the communications server, or before the user logs on or sends a message.

The characteristics include characteristics that are indicative of whether the communications account user is a spammer or not. Some characteristics may be those that are typically stored or otherwise available during the communication account provider's normal course of business, but typically not used for spam filtering or detection, while others may be characteristics typically collected and used for spam filtering or detection. The characteristics also may include characteristics that are related to having an account, rather than related to sending or receiving messages with an account.

Referring to FIG. 4A, as an example of characteristic typically available during the course of business and related to having an account, the characteristics may include the length of time the user has maintained the communications account, i.e., how long the communications account has existed (402). Some service providers (e.g., AOL and MSN) offer free trial accounts that last for a short period of time (typically for a preset number of hours the user may be connected to the service or for a preset number of days regardless of the time connected to the service). Spammers typically use such free accounts so as to keep down their costs. A spammer normally will use a trial account during the trial period, and when the trial period is over, the spammer will get a new trial account. Thus, one characteristic of an account being used for spam may be how long the account has existed or the account type/status (e.g., temporary or free). An account that has been open for a short period of time (especially if it has been open for a period of time less than the trial period) is more likely a spammer account. The information stored regarding this characteristic may be an indication of whether the account is older than a predetermined period (e.g., 45 days) or not.

When the communications account corresponds to an integrated suite of communications services (such as those provided by AOL), aspects of the account relating to the other services also may be indicative of whether the account is being used by a spammer or not (404). The communications services may include message boards where users may post messages using their communications accounts. If a message is posted by a communications account, it is less likely that account is being used by a spammer. Whether the account has used other provided services may be a characteristic typically available during the course of business and that are related to having an account, but not typically used for spam filtering or detection.

Some services also include a ratings function on such message boards (406). The ratings function allows other users to rate the informational value of the post to the message board. Ratings also may allow other users to rate how informative or interesting a given account's posts normally are. The existence, volume and also the merits of the ratings associated with an account may be accessed to assist in determining if the account is likely operated by a spammer. For example, if an account has some ratings associated with it, then it is less likely the account is being used by a spammer.

Also, some services allow parental controls to be applied to a communications account (408). Parental controls allow parents to place limits on how a child may use a communications account. The existence of parental controls on an account would indicate that the account is not being used by a spammer. The ratings and/or parental controls associated with an account are characteristics typically available during the normal course of business and that are related to having an account, but not typically used for spam filtering or detection.

Another characteristic that may be available, but not normally used for spam, relates to the amount of communications in the account that have been opened or otherwise accessed (410). Particularly, for e-mail, spammers tend to use an e-mail account to send spam, however, they do not normally use that same account to receive responses to the spam sent. Thus, an indication of whether an account is being operated by a spammer may be obtained by evaluating, for example, whether any communications in the communications account have been opened or otherwise accessed; a ratio of opened or otherwise accessed communications to unopened or otherwise unaccessed communications; or the ratio of accessed communications to communications received by the account. Accordingly, for instance, if an evaluation of the number of accessed communications; the ratio of accessed communications to unaccessed communications; and/or the ratio of unaccessed communications to received communications indicates that one or more of these items is below a certain threshold, this may indicate that the account is being used by a spammer. The exact threshold may be determined as a matter of design for a particular system. Such a metric may be computed with reference to the account of the sender maintained by his or her e-mail service provider, or by reference to an aggregated statistic maintained by a recipient e-mail service provider or destination (e.g., number of replies to sender or lack of replies to sender, and/or the number of replies received from that sender.

The amount of communications to different communications addresses (e.g., e-mail addresses) (412) also may be another characteristic that is available, but not normally used for spam detection. For e-mail, a spammer typically sends a large number of e-mails to different e-mail accounts, but tends to send very few e-mails to the same e-mail account. In contrast, a legitimate user typically sends a larger number of e-mails to the same e-mail addresses. Thus, an indication of whether an account is being operated by a spammer may be obtained by evaluating, for example, the number of communications sent to different communication addresses by the communications account or a ratio of the number of communications sent to the number of different accounts to which the communications are sent. Accordingly, for instance, if an evaluation of the number of communications sent to different communication addresses by the communications account or a ratio of the number of communications sent to the number of different accounts to which the communications are sent is above a certain threshold, this may indicate that the account is being used by a spammer. As with the accessing characteristic described immediately above, the exact threshold may be determined as a matter of design for a particular system.

Another characteristic that may be available during the normal course of business, but not typically used for spam detection/prevention is the amount of time that typically elapses between the sender and receiver exchanging messages (414). This characteristic may be particularly useful for IM communications, which typically occur more closely in real-time than do e-mail messages. In IM communications, for example, a spammer is unlikely to continue carrying on a conversation with a person, thus after the initial spam message, the spammer may be unlikely to send another message for a long period of time. For instance, the spammer may send a spam message to a user, the user may respond to the spammer complaining about the spam within, for example, 5 seconds. The spammer, however, is unlikely to respond to the complaint. The next communication from the spammer to the user is likely to be much later when the spammer sends out another round of spam. Thus, for instance, if the spammer does not respond to the user until several hours later, this may indicate that the account is being used by a spammer. On the other hand, if a first user sends a second user a message and the second user responds within, e.g., 5 seconds, and then the first user responds to the second user, also, e.g, within 5 seconds, then it may be inferred that they are actually carrying on a conversation and that the first user is not a spammer. Observation of this characteristic with respect to communications by a sender with one or several recipients may inform a conclusion regarding the sender's status as a spammer, which may then be applied to filter communications with those or other recipients in the future.

The amount of time of the current session (i.e., how long has the account been logged in for the current session), or the average amount of time logged in (416), is another characteristic that may be available and that are related to having an account, but not typically used for spam detection/prevention. If a communications account typically is logged in for a longer period of time (e.g., a couple of hours) or has already been logged on for a longer period of time, then it is less likely that the account is being used by a spammer. Being logged in for a longer period of time indicates the account is not being operated by a spammer because spammers typically log in, send messages, and then log off.

A characteristic that normally may be used for spam filtering or detection is the ratio of outgoing messages to incoming messages for an account (418). Spammers typically have a higher ratio of outgoing messages to incoming messages. This is because they are sending to hundreds or thousands of recipients, but typically only get replies from a few percent of those recipients. Moreover, spammers do not normally use their spam accounts for personal communications. The information stored regarding this characteristic may be an indication of whether the ratio is over a particular amount (e.g., 50:1) or not.

Other characteristics that normally may be used for spam filtering or detection and that may be used, particularly when actions are taken on a particular message, include (1) whether messages have been sent to the recipient address of the message by the communications account in the past (420); (2) whether the intended recipient of the message has sent messages to the communications account in the past (422); or (3) whether a contact list (e.g., a buddy list or address book) of the intended recipient includes the communications account from which the message is being sent (424). If, in the past, messages have been sent between the communications account and a current recipient address, then it is less likely the account is being used for spam. Also, if an intended recipient of a message has the sender's communications account in his or her address book or buddy list, it is less likely the account is being used by a spammer.

As described, the characteristics are used to determine whether the communications account is likely being operated by a spammer (310). Similar to the accessing (305), the determination (310) can be done when the user of the account logs onto the communications server using the account, when a message to be sent is submitted to the communications server, or before the user logs on or sends a message.

Figure 4B:
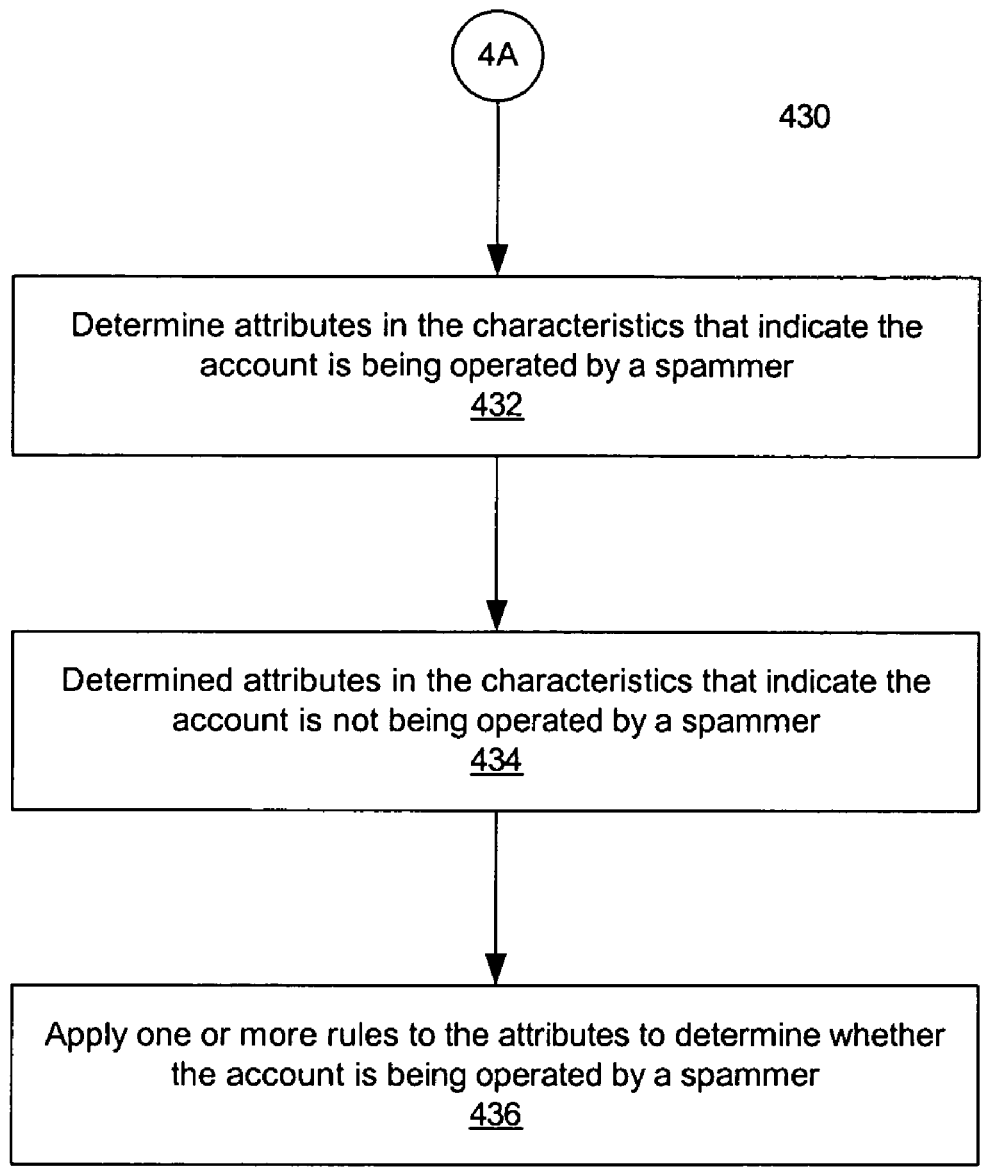
FIG. 4B is a flowcharts showing an implementation of step 310 in FIG. 3.

The determination (310) can be based on a number of different techniques and may include techniques that take into account characteristics that indicate the account is being operated by a spammer along with characteristics that indicate the account is not being operated by a spammer. The techniques also may include techniques where the characteristics that indicate the account is being operated by a spammer are discounted by the characteristics that indicate the account is not being operated by a spammer or the characteristics that indicate the account is not being operated by a spammer are discounted by the characteristics that indicate the account is being operated by a spammer FIG. 4B is a flowchart showing an implementation of step 310 in which a rule is applied that takes into account characteristics that indicate the account is being operated by a spammer and characteristics that indicate the account is not being operated by a spammer to determine whether the account is being operated by a spammer. An account may be considered as being operated by a spammer when one or more attributes exist in the characteristics of the account that indicate the account is being operated by a spammer, except for when there is one or more offsetting characteristics present. For instance, if the account has an outgoing message to incoming message ratio greater than a threshold ratio (e.g., 50:1), then the account may be considered as being used by a spammer, unless the account has parental controls or ratings associated with it. As another example, the account may be considered as being used by a spammer when the outgoing message to incoming message ratio is greater than 50:1 and the account has existed for less than 45 days, unless the account has parental controls associated with it or the account has posted messages on the message boards. Other combinations and number of attributes may be used.

In the implementation shown in FIG. 4B, attributes in the characteristics that indicate the account is being operated by a spammer are determined (432). Similarly, attributes in the characteristics that indicate the account is not being operated by a spammer are determined (434). One or more rules then are applied to the attributes to determine whether the account is being operated by a spammer (436).

Figure 4C:
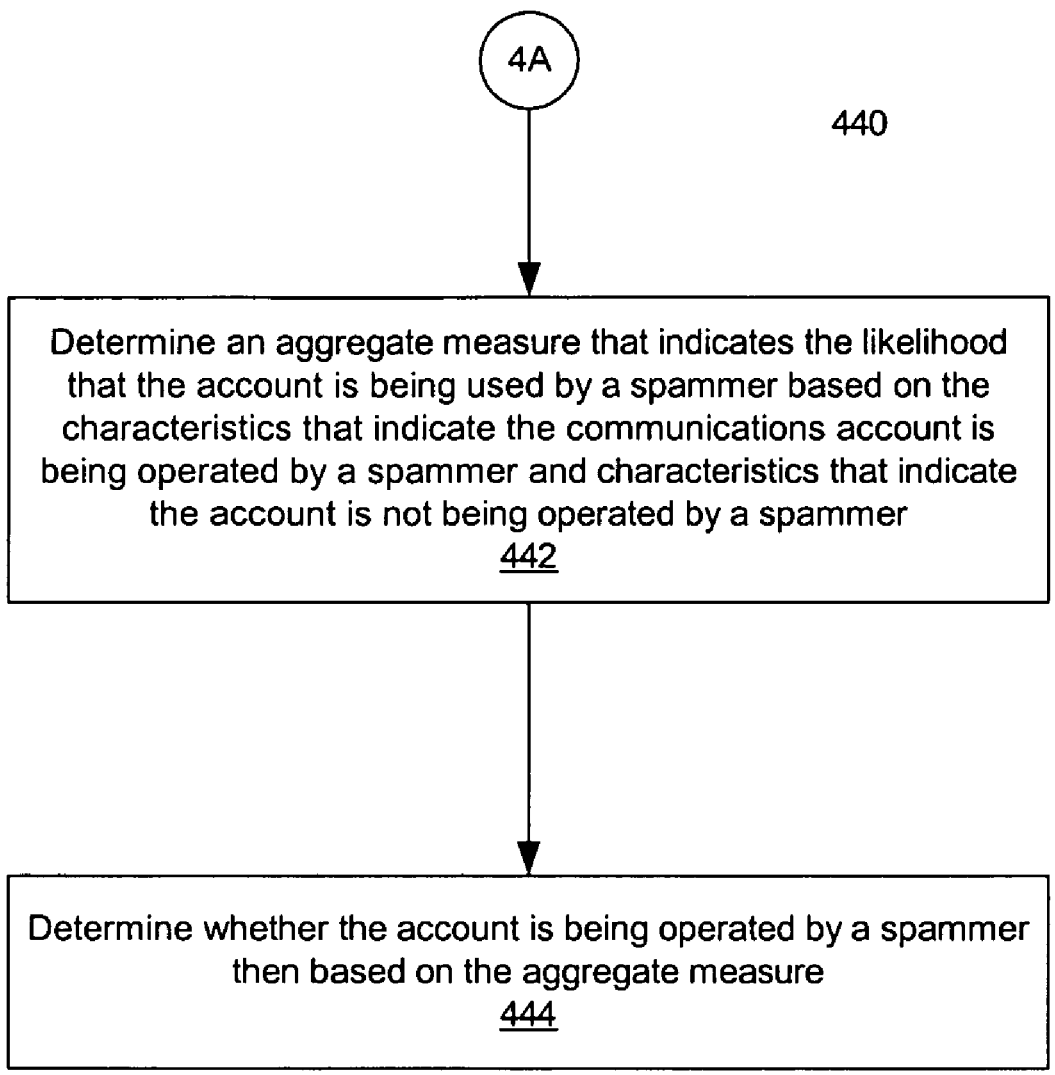
FIG. 4C is a flowcharts showing an implementation of step 310 in FIG. 3.

FIG. 4C is a flowchart showing an implementation of step 310 in which the characteristics that indicate the account is being operated by a spammer and the characteristics that indicate the account is not being operated by a spammer are used to offset or discount each other in coming to a determination as to whether the account is being operated by a spammer. In the implementation of FIG. 4C, an aggregate measure that indicates the likelihood that the account is being used by a spammer is determined based on the characteristics that indicate the communications account is being operated by a spammer and characteristics that indicate the account is not being operated by a spammer (442). When used to determine the aggregate measure, the characteristics that indicate the communications account is being operated by a spammer and characteristics that indicate the account is not being operated by a spammer offset each other. Whether the account is being operated by a spammer then is determined based on the aggregate measure (444).

For example, scores may be assigned to attributes in the characteristics based on how indicative the attribute is of whether the account is or is not being used by a spammer. An aggregate score may be formed based on the various attributes present and the assigned scores. When the aggregate score surpasses some threshold score, the account may be considered as being used by a spammer.

A scheme such as the following may be used, for instance:

| Attribute | Score |
|---|---|
| Account <45 days old | 3 |
| Outgoing to incoming ratio >50:1 | 4 |
| Message board post exists | −1 |
| Parental controls exist | −3 |

If the threshold score is 5, then an account will be considered as being used by a spammer when the account is less than 45 days old, the outgoing message to incoming message ratio is greater than 50:1, and neither a message board post or parental controls exist (because the aggregate score is 7). Even if a message board post existed, the account would still be considered as being used by a spammer because the aggregate score in that case is 6. On the other hand, if parental controls existed, the account would not be considered as being used by a spammer because the aggregate score in that case is 4, which is below the threshold score of 5.

FIG. 5 illustrates a more specific example using the attributes in the table above and a threshold of 5. A user of client terminal 110a has an account with ISP 120a. The account is six months old, has an outgoing to incoming message ratio of approximately 2:1, has been used to post messages to message boards maintained by the ISP 120a, and does not have parental controls. These characteristics of the account are stored in data store 150a. The user uses an e-mail client program on client terminal 110a to compose and send an e-mail to an e-mail account on e-mail server 130b. When the user indicates the composed e-mail is to be sent, the e-mail client program on client terminal 110a contacts e-mail server 130a to submit the composed e-mail to e-mail server 130a for delivery. When e-mail server 130a is contacted (or, alternatively, when the composed e-mail has been submitted to e-mail server 130a), e-mail server 130a identifies the account of the user (505). E-mail server 130a then accesses the characteristics of the account in data store 150a and determines which attributes are present in the characteristics of the account. In this case, e-mail server 130a accesses information regarding the amount of time the account has been maintained (510); information regarding the outgoing to incoming message ratio (515); and information regarding parental controls for the account (520). This information informs the e-mail server 130a that message board posts exist for this account (the only attribute present because the account is not less than 45 days old, does not have an outgoing to incoming message ratio greater than 50:1, and does not have parental controls). E-mail server 130a then accesses the assigned scores for the attributes present (525) (in this case −1 because message board posts are the only attributes present) and adds up the assigned scores for the attributes present to obtain an aggregate score. The aggregate score (−1) is compared to the threshold score (5) (535). In this case, because the aggregate score is less than the threshold score, the account is not considered to be one operated by a spammer and e-mail server 130a consequently transmits the composed e-mail to e-mail server 130b as normal (540).

Similarly, still referring to FIG. 5, as a second more specific example using the attributes in the table above and a threshold of 5, a user a user of client terminal 110a has an account with ISP 120a. The account is thirty days old, has an outgoing to incoming message ratio of approximately 1000:1, has not been used to post messages to message boards maintained by the ISP 120a, and does not have parental controls associated with it. These characteristics of the account are stored in data store 150a. The user uses an e-mail client program on client terminal 110a to compose and send an e-mail to an e-mail account on e-mail server 130b. When the user indicates the composed e-mail is to be sent, the e-mail client program on client terminal 110a contacts e-mail server 130a to submit the composed e-mail to e-mail server 130a for delivery. When e-mail server 130a is contacted (or, alternatively, when the composed e-mail has been submitted to e-mail server 130a), e-mail server 130a identifies the account of the user (505). E-mail server 130a then accesses the characteristics of the account in data store 150a and determines which attributes are present in the characteristics of the account. In this case, e-mail server 130a accesses information regarding the amount of time the account has been maintained (510); information regarding the outgoing to incoming message ratio (515); and information regarding parental controls for the account (520). This information informs the e-mail server 130a that that the account is less than 45 days old and that the outgoing to incoming message ratio is greater than 50:1. E-mail server 130a then accesses the assigned scores for the attributes present (525) (in this case 3 and 4, respectively) and adds up the assigned scores for the attributes present to obtain an aggregate score. The aggregate score (7) is compared to the threshold score (5) (535). In this case, because the aggregate score is greater than the threshold score, the account is considered to be one operated by a spammer and e-mail server 130a consequently limits the account accordingly (545). For example, if the e-mail was submitted before the account was determined, e-mail server 130a may delete the e-mail or otherwise block the delivery of the e-mail. Alternatively, for example, if the determination of the account is made when e-mail client program first contacts e-mail server 130a, i.e. before the e-mail is submitted, e-mail server 130a may delay the submission of the e-mail from the e-mail client program to e-mail server 130a.

While these examples provide illustrations of the determinations of the account, the aggregate score, and the comparison of the aggregate score to the threshold score being performed after the e-mail program on client terminal 110a contacts e-mail server 130a for submission of the e-mail, any of these actions may be performed before the e-mail program contacts e-mail server 130a for submission of the e-mail. For example, before e-mail server 130a is contacted for the submission of an e-mail, e-mail server may determine the attributes of an account, determine the aggregate score, and compare the aggregate score to the threshold score to determine whether the account is likely operated by a spammer. This determination as to the likelihood of the account being operated by a spammer may then be stored in data store 150a. Then, when e-mail server 130a is contacted for submission of an e-mail (or, when an e-mail is submitted), e-mail server 130a may access this determination, and apply any limitations, as appropriate, based on the accessed determination.

The determination as to whether the account is likely operated by a spammer may be made indirectly by inputting the characteristics (or data indicative of the existence of certain attributes in the characteristics) into a spam filter to be considered as features of a message, in addition to the message's content. A spam filter may be implemented using a number of techniques. One technique that may be used is simple feature filtering, in which an e-mail's headers and/or the e-mail body is searched for certain features and the e-mail is classified as spam based on whether the certain feature or features are present. Other techniques analyze word or other features of an e-mail to develop a score or probability measure indicative of the likelihood that the e-mail is spam, and then compare the score or measure to a classification threshold. If the score or measure exceeds the threshold, the e-mail is designated as spam. The techniques used to develop the score or measure may be, for example, heuristic or Bayesian based. The characteristics or attributes in the characteristics may be used as another feature in these techniques to help in the determination of whether an e-mail is spam and, hence, the communications account from which it was sent is being used by a spammer.

As described above, when the determination 310 indicates that the communications account is not likely being operated by a spammer, the account may be allowed to operate normally (315). That is, the limitations described below may not be applied.

Also as described above, when the determination (310) indicates that the communications account is likely being operated by a spammer, the usage of the account for outgoing messages is limited (320). In some implementations, the limitation may be a rate limit placed on the communications account. The rate limit prevents more than a certain number of messages from being sent in a specified period of time. For example, an e-mail account may be limited to twenty messages per hour.

Conversely, the limitation may be the continued enforcement of limitations previously placed on the account. Service providers may a priori place rate limits on their communications services to prevent the services from being used to send spam. However, legitimate users may become particularly proficient with a communication service and, consequently, approach the rate limit when sending non-spam communications. For example, in IM services, some teenagers and young adults have become particularly proficient with sending IMs. These users may find themselves encountering the rate limits, even though they are not sending spam messages. To prevent this, when a determination is made that an account is not being used by a spammer, such a rate limit for that account may be relaxed (i.e., the rate of messages may be increased) or eliminated. Thus, in this case, the usage of a spammer account is limited by keeping in place the rate limits.

In other implementations, tarpitting may be applied to the communications account to limit the use of the account. Tarpitting involves delaying the submission of a message. That is, the e-mail, IM host, or other server may purposefully slow down how long it takes to receive the message from the client when the client is submitting the message. This results in an increase in the time to send e-mails. Because spammers typically need to send as many e-mails, IMs or other communications as possible, and as quickly as possible (so as to reach the largest possible audience), tarpitting increases the costs for spammers and reduces the amount of service provider bandwidth used by the spammer.

In some implementations, the limitation on the usage of the account may include messages from the account being blocked or deleted. Alternatively, the messages may be delivered to the intended recipient, but placed in a spam folder instead of an inbox folder. That is, the limitation includes delivering the messages to a folder other than the intended recipient's inbox. Such techniques may be used particularly when the characteristics or attributes in the characteristics are input into a spam filter and a determination is made that a particular message is spam based on the characteristics or attributes in the characteristics.

Limiting may include marking or distinguishing (e.g., visually or otherwise) communications delivered to an intended recipient from the communications account. For example, communications from the communications account may be displayed in bold, while communications from other accounts are not displayed in bold. Or, conversely, messages from the communications account may be displayed in normally, while communications from other accounts are displayed in bold. Similarly, communications from the communications account may be displayed in one color, while communications from other accounts are displayed in a different color. Another manner of distinguishing communications from the communications account includes grouping all of the communications from communications account (possibly along with other accounts whose characteristics indicate they may be used by spammers) in one position of a display, for example, at the beginning or at the end of a list of communications.

Combinations of limitations also may be applied to the communications account.

In some implementations, when a scoring scheme is used to make the determination (310), the limitation placed on the account may differ based on the score. For example, if the score is less than X, nothing is done, if the score is between X+1 and M, tarpitting is applied, and, if the score is greater than M, then messages from the account are blocked or deleted. Alternatively, for example, tarpitting may be increasingly applied for higher scores, i.e., as scores increase, so does the length of time it takes to submit a message to the e-mail, IM host or other server. Similarly, when a spam filter that develops a score or probability measure indicative of the likelihood that the e-mail is spam is used, the way a message is treated may depend on the score or probability measure for that message.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, the communications could be limited by the server instructing the client to rate limit itself or to take other actions, or by the server refusing to log on the client program. Accordingly, other implementations are within the scope of the following claims.

What is claimed is:

1. A method of controlling the usage of a communications account, the method comprising:
  accessing communications account characteristics that indicate the communications account is being operated by a spammer and that indicate the communications account is not being operated by a spammer, wherein accessing the communications account characteristics includes accessing information indicative of characteristics which include one or more of the following:
  a length of time the communications account has been maintained,
  access by the communications account of services not relating to email,
  access or status of parental controls for the communications account, a difference in proportion or number between outgoing and incoming communications, and whether an intended recipient of a communication by the communications account has previously sent a communication to the communications account;

determining an aggregate measure that indicates a likelihood that the communications account is being used by a spammer based on the characteristics that indicate the communications account is being operated by a spammer and characteristics that indicate the communications account is not being operated by a spammer, wherein the characteristics that indicate the communications account is being operated by a spammer and the characteristics that indicate the communications account is not being operated by a spammer offset each other when used to determine the aggregate measure;

determining whether the communications account is being operated by a spammer based on comparing the aggregate measure to at least one threshold measure to determine whether the aggregate measure indicates that the communications account is being operated by a spammer; and preventing outgoing communications from leaving the communications account in response to the determination that the communications account is being operated by a spammer based on the aggregate measure, wherein the communications account is located at a client terminal or is located at a communications server associated with the client terminal.

2. The method of claim 1 wherein accessing the communications account characteristics includes accessing information indicative of a length of time the communications account has been maintained.

3. The method of claim 1 wherein accessing the communications account characteristics includes accessing information indicative of a difference in proportion or number between outgoing and incoming communications.

4. The method of claim 1 wherein accessing the communications account characteristics includes accessing information indicative of access by the communications account of services not relating to email.

5. The method of claim 1 wherein accessing the communications account characteristics includes accessing information indicative of whether there are ratings associated with the communications account.

6. The method of claim 1 wherein accessing the communications account characteristics includes accessing information indicative of access or status of parental controls for the communications account.

7. The method of claim 1 wherein accessing the communications account characteristics includes accessing information indicative of whether an intended recipient of a communication by the communications account has previously sent a communication to the communications account.

8. The method of claim 1 wherein accessing the communications account characteristics includes accessing information indicative of whether an intended recipient has the communications account in a contact list.

9. The method of claim 1 wherein:

the at least one threshold measure comprises a first and second threshold measure;

comparing the aggregate measure to at least one threshold measure further comprises comparing the aggregate measure to the first threshold measure to determine whether the aggregate measure surpasses the first threshold measure and comparing the aggregate measure to the second threshold measure to determine if the aggregate measure surpasses the second threshold measure; and preventing outgoing communications from leaving the communications account comprises preventing outgoing communications from leaving the communications account differently based on whether the aggregate measure surpasses the first threshold or the second threshold.

10. The method of claim 1 wherein preventing further comprises deleting or blocking a message from delivery to an intended recipient of the message.

11. The method of claim 1 wherein preventing further comprises placing a rate limit on the communications account that prevents more than a certain number of messages from being sent from the communications account in a specified period of time.

12. The method of claim 1 wherein preventing further comprises the continued enforcement of limitations previously placed on the communications account.

13. The method of claim 12 wherein the limitations previously placed on the communications account include a rate limit placed on the communications account.

14. The method of claim 13 further comprising relaxing the rate limit when the communications account is determined to not be operated by a spammer.

15. The method of claim 12 further comprising relaxing the limitations previously placed on the communications account when the communications account is determined to not be operated by a spammer.

16. The method of claim 1 wherein preventing further comprises increasing the time required to send a communication.

17. The method of claim 1 wherein preventing further comprises distinguishing communications delivered to an intended recipient from the communications account.

18. The method of claim 1 wherein the communications are e-mails.

19. The method of claim 1 wherein the communications are instant messages.

20. The method of claim 1 wherein the communications are SMS messages.

21. The method of claim 1 wherein the communications are MMS messages.

22. The method of claim 1 wherein determining the aggregate measure comprises:

allocating scores to certain attributes in the communications account characteristics;

detecting which attributes are present in the communications account characteristics; and forming the aggregate measure based on the assigned scores and the attributes present in the communications account characteristics.

23. The method of claim 22 wherein:

the at least one threshold measure comprises a first and second threshold measures;

comparing the aggregate measure to at the least one threshold measure further comprises comparing the aggregate measure to the first threshold measure to determine whether the aggregate measure surpasses the first threshold measure and comparing the aggregate measure to the second threshold score to determine if the aggregate measure surpasses the second threshold measure; and preventing outgoing communications from leaving the communications account comprises preventing outgoing communications from leaving the communications account differently based on whether the aggregate measure surpasses the first threshold or the second threshold.

24. The method of claim 1 wherein determining whether the communications account is being operated by a spammer based on comparing the aggregate measure comprises inputting the communications account characteristics or data indicative of the existence of certain attributes in the communications account characteristics into a spam filter to be considered as features of a message from the communications account.

25. The method of claim 1 wherein preventing outgoing communications from leaving the communications account in response to the determination that the communications account is being operated by a spammer based on the aggregate measure includes preventing outgoing communication from being sent through the Internet.

26. The method of claim 1 wherein the communications account is located at a client terminal.

27. The method of claim 1 wherein the communications server is an e-mail server and the communication account is located at the e-mail server.

28. The method of claim 4 wherein accessing information indicative of access by the communications account of services not relating to email includes accessing information indicative of whether a message has been posted to a message board by the communications account.

29. A computer storage medium having a computer program embodied thereon for controlling the usage of a communications account, the computer program comprising instructions for causing a computer to perform the following operations:

access communications account characteristics that indicate the communications account is being operated by a spammer and that indicate the communications account is not being operated by a spammer wherein accessing the communications account characteristics includes accessing information indicative of characteristics which include one or more of the following:
    a length of time the communications account has been maintained,
    access by the communications account of services not relating to email,
    access or status of parental controls for the communications account,
    a difference in proportion or number between outgoing and incoming communications, and
    whether an intended recipient of a communication by the communications account has previously sent a communication to the communications account;
  determine an aggregate measure that indicates a likelihood that the communications account is being used by a spammer based on the characteristics that indicate the communications account is being operated by a spammer and characteristics that indicate the communications account is not being operated by a spammer, wherein the characteristics that indicate the communications account is being operated by a spammer and the characteristics that indicate the communications account is not being operated by a spammer offset each other when used to determine the aggregate measure;
  determine whether the communications account is being operated by a spammer based on comparing the aggregate measure to at least one threshold measure to determine whether the aggregate measure indicates that the communications account is being operated by a spammer; and
  prevent outgoing communications from leaving the communications account in response to the determination that the communications account is being operated by a spammer based on the aggregate measure, wherein the communications account is located at a client terminal or is located at a communications server associated with the client terminal.

30. The medium of claim 29 wherein accessing the communications account characteristics includes accessing information indicative of a length of time the communications account has been maintained.

31. The medium of claim 29 wherein accessing the communications account characteristics includes accessing information indicative of a difference in proportion or number between outgoing and incoming communications.

32. The medium of claim 29 wherein accessing the communications account characteristics includes accessing information indicative of access by the communications account of services not relating to email.

33. The medium of claim 29 wherein accessing the communications account characteristics includes accessing information indicative of whether there are ratings associated with the communications account.

34. The medium of claim 29 wherein accessing the communications account characteristics includes accessing information indicative of access or status of parental controls for the communications account.

35. The medium of claim 29 wherein accessing the communications account characteristics includes accessing information indicative of whether an intended recipient of a communication by the communications account has previously sent a communication to the communications account.

36. The medium of claim 29 wherein accessing the communications account characteristics includes accessing information indicative of whether an intended recipient has the communications account in a contact list.

37. The medium of claim 29 wherein:
  the at least one threshold measure comprises a first and second threshold measure;
  to compare the aggregate measure to at least one threshold measure, the computer program further comprises instructions for causing a computer to compare the aggregate measure to the first threshold measure to determine whether the aggregate measure surpasses the first threshold measure and compare the aggregate measure to the second threshold measure to determine if the aggregate measure surpasses the second threshold measure; and
  to prevent outgoing communications from leaving the communications account, the computer program further comprises instructions for causing a computer to prevent outgoing communications from leaving the communications account differently based on whether the aggregate measure surpasses the first threshold or the second threshold.

38. The medium of claim 29 wherein, to prevent outgoing communications from leaving the communications account, the computer program further comprises instructions for causing a computer to delete or block a message from delivery to an intended recipient of the message.

39. The medium of claim 29 wherein, to prevent outgoing communications from leaving the communications account, the computer program further comprises instructions for causing a computer to place a rate limit on the communications account that prevents more than a certain number of messages from being sent from the communications account in a specified period of time.

40. The medium of claim 29 wherein, to prevent outgoing communications from leaving the communications account, the computer program further comprises instructions for causing a computer to continue enforcement of limitations previously placed on the communications account.

41. The medium of claim 40 wherein the limitations previously placed on the communications account include a rate limit placed on the communications account.

42. The medium of claim 41 wherein the computer program further comprises instructions for causing a computer to relax the rate limit when the communications account is determined to not be operated by a spammer.

43. The medium of claim 40 wherein the computer program further comprises instructions for causing a computer to relax the limitations previously placed on the communications account when the communications account is determined to not be operated by a spammer.

44. The medium of claim 29 wherein, to prevent outgoing communications from leaving the communications account, the computer program further comprises instructions for causing a computer to increase the time required to send a communication.

45. The medium of claim 29 wherein, to prevent outgoing communications from leaving the communications account, the computer program further comprises instructions for causing a computer to distinguish communications delivered to an intended recipient from the communications account.

46. The medium of claim 29 wherein the communications are e-mails.

47. The medium of claim 29 wherein the communications are instant messages.

48. The medium of claim 29 wherein the communications are SMS messages.

49. The medium of claim 29 wherein the communications are MMS messages.

50. The medium of claim 29 wherein, to determine the aggregate measure, the computer program further comprises instructions for causing a computer to:
   allocate scores to certain attributes in the communications account characteristics;
   detect which attributes are present in the communications account characteristics; and
   form the aggregate measure based on the assigned scores and the attributes present in the communications account characteristics.

51. The medium of claim 50 wherein:
   the at least one threshold measure comprises a first and second threshold measures;
   to compare the aggregate measure to at least one threshold measure, the computer program further comprises instructions for causing a computer to compare the aggregate measure to the first threshold measure to determine whether the aggregate measure surpasses the first threshold measure and compare the aggregate measure to the second threshold measure to determine if the aggregate measure surpasses the second threshold measure; and
   to prevent outgoing communications from leaving the communications account, the computer program further comprises instructions for causing a computer to prevent outgoing communications from leaving the communications account differently based on whether the aggregate measure surpasses the first threshold or the second threshold.

52. The medium of claim 29 wherein, to determine whether the communications account is being operated by a spammer based on comparing the aggregate measure, the computer program further comprises instructions for causing a computer to input the communications account characteristics or data indicative of the existence of certain attributes in the communications account characteristics into a spam filter to be considered as features of a message from the communications account.

53. The medium of claim 29 wherein preventing outgoing communications from leaving the communications account in response to the determination that the communications account is being operated by a spammer based on the aggregate measure includes preventing outgoing communication from being sent through the Internet.

54. The medium of claim 32 wherein accessing information indicative of access by the communications account of services not relating to email includes accessing information indicative of whether a message has been posted to a message board by the communications account.

55. A method of controlling the usage of a communications account, the method comprising:
   accessing a sender's communications account characteristics that enable perception that the communications account is being operated by a spammer and that enable perception that the communications account is not being operated by a spammer, wherein the account characteristics are associated with one or more of the following:
      a length of time the account has been maintained,
      access by the account of services other than services relating to email,
      access or status of parental controls for the account,
      a difference in proportion or number between outgoing and incoming communications, and
      whether an intended recipient of a communication by the account has previously sent a communication to the account;
   determining an aggregate measure that indicates the likelihood that the communications account is being operated by a spammer based on the characteristics that enable perception that the communications account is being operated by a spammer and characteristics that enable perception that the communications account is not being operated by a spammer, wherein the characteristics that enable perception that the communications account is being operated by a spammer and the characteristics that enable perception that the communications account is not being operated by a spammer offset each other when used to determine the aggregate measure;
   determining whether the communications account is being operated by a spammer based on comparing the aggregate measure to at least one threshold measure to determine whether the characteristics of the communications account indicate that the communications account is being operated by a spammer; and
   limiting the use of the communications account for outgoing communications when the communications account is determined to be operated by a spammer.

56. The method of claim 55 wherein accessing the communications account characteristics includes accessing information associated with a length of time the communications account has been maintained.

57. The method of claim 55 wherein accessing the communications account characteristics includes accessing information associated with a difference in proportion or number between outgoing and incoming communications.

58. The method of claim 55 wherein accessing the communications account characteristics includes accessing information associated with access by the account of services other than services relating to email.

59. The method of claim 58 wherein accessing the communications account characteristics associated with access by the account of services other than services relating to email includes accessing information associated with whether a message has been posted to a message board by the communications account.

60. The method of claim 55 wherein accessing the communications account characteristics includes accessing information associated with whether there are ratings associated with the communications account.

61. The method of claim 55 wherein accessing the communications account characteristics includes accessing information associated with access or status of parental controls for the communications account.

62. The method of claim 55 wherein accessing the communications account characteristics includes accessing information associated with whether an intended recipient of a communication by the communications account has previously sent a communication to the communications account.

63. The method of claim 55 wherein accessing the communications account characteristics includes accessing information associated with whether an intended recipient has the communications account in a contact list.

64. The method of claim 55 wherein:
the at least one threshold measure comprises a first and second threshold measure;
comparing the aggregate measure to at least one threshold measure further comprises comparing the aggregate measure to the first threshold measure to determine whether the aggregate measure surpasses the first threshold measure and comparing the aggregate measure to the second threshold measure to determine if the aggregate measure surpasses the second threshold measure; and
limiting the use of the communications account for outgoing communications comprises limiting the use of the communications account for outgoing communications differently based on whether the aggregate measure surpasses the first threshold or the second threshold.

65. The method of claim 55 wherein determining the aggregate measure comprises:
allocating scores to certain attributes in the communications account characteristics;
detecting which attributes are present in the communications account characteristics; and
forming the aggregate measure based on the assigned scores and the attributes present in the communications account characteristics.

66. The method of claim 65 wherein:
the at least one threshold measure comprises a first and second threshold measures;
comparing the aggregate measure to the at least one threshold measure further comprises comparing the aggregate measure to the first threshold measure to determine whether the aggregate measure surpasses the first threshold measure and comparing the aggregate measure to the second threshold score to determine if the aggregate measure surpasses the second threshold measure; and
preventing outgoing communications from leaving the communications account comprises preventing outgoing communications from leaving the communications account differently based on whether the aggregate measure surpasses the first threshold or the second threshold.

67. The method of claim 55 wherein determining whether the communications account is being operated by a spammer based on comparing the aggregate measure comprises inputting the communications account characteristics or data indicative of the existence of certain attributes in the communications account characteristics into a spam filter to be considered as features of a message from the communications account.

68. A computer storage medium having a computer program embodied thereon for controlling the usage of a communications account, the computer program comprising instructions for causing a computer to perform the following operations:
access a sender's communications account characteristics that enable perception that the communications account is being operated by a spammer and that enable perception that the communications account is not being operated by a spammer, wherein the account characteristics are associated with one or more of the following:
a length of time the account has been maintained,
access by the account of services other than services relating to email,
access or status of parental controls for the account,
a difference in proportion or number between outgoing and incoming communications, and
whether an intended recipient of a communication by the account has previously sent a communication to the account;
determine an aggregate measure that indicates the likelihood that the communications account is being operated by a spammer based on the characteristics that enable perception that the communications account is being operated by a spammer and characteristics that enable perception that the communications account is not being operated by a spammer, wherein the characteristics that enable perception that the communications account is being operated by a spammer and the characteristics that enable perception that the communications account is not being operated by a spammer offset each other when used to determine the aggregate measure;
determine whether the communications account is being operated by a spammer based on comparing the aggregate measure to at least one threshold measure to determine whether the characteristics of the communications account indicate that the communications account is being operated by a spammer; and
limit the use of the communications account for outgoing communications when the communications account is determined to be operated by a spammer.

69. The medium of claim 68 wherein accessing the communications account characteristics includes accessing information associated with a length of time the communications account has been maintained.

70. The medium of claim 68 wherein accessing the communications account characteristics includes accessing information associated with a difference in proportion or number between outgoing and incoming communications.

71. The medium of claim 68 wherein accessing the communications account characteristics includes accessing information associated with access by the account of services other than services relating to email.

72. The medium of claim 71 wherein accessing the communications account characteristics associated with access by the account of services other than services relating to email includes accessing information associated with whether a message has been posted to a message board by the communications account.

73. The medium of claim 68 wherein accessing the communications account characteristics includes accessing information associated with whether there are ratings associated with the communications account.

74. The medium of claim 68 wherein accessing the communications account characteristics includes accessing information associated with access or status of parental controls for the communications account.

75. The medium of claim 68 wherein accessing the communications account characteristics includes accessing information associated with whether an intended recipient of a communication by the communications account has previously sent a communication to the communications account.

76. The medium of claim 68 wherein accessing the communications account characteristics includes accessing information associated with whether an intended recipient has the communications account in a contact list.

77. The medium of claim 68 wherein:
the at least one threshold measure comprises a first and second threshold measure;
to compare the aggregate measure to at least one threshold measure, the computer program further comprises instructions for causing a computer to compare the aggregate measure to the first threshold measure to determine whether the aggregate measure surpasses the first threshold measure and comparing the aggregate measure to the second threshold measure to determine if the aggregate measure surpasses the second threshold measure; and
to limit the use of the communications account for outgoing communications, the computer program further comprises instructions for causing a computer to limit the use of the communications account for outgoing communications differently based on whether the aggregate measure surpasses the first threshold or the second threshold.

78. The medium of claim 68 wherein to determine the aggregate measure, the computer program further comprises instructions for causing a computer to:

allocate scores to certain attributes in the communications account characteristics;
detect which attributes are present in the communications account characteristics; and
form the aggregate measure based on the assigned scores and the attributes present in the communications account characteristics.

79. The medium of claim 78 wherein:
the at least one threshold measure comprises a first and second threshold measures;
to compare the aggregate measure to the at least one threshold measure, the computer program further comprises instructions for causing a computer to compare the aggregate measure to the first threshold measure to determine whether the aggregate measure surpasses the first threshold measure and comparing the aggregate measure to the second threshold score to determine if the aggregate measure surpasses the second threshold measure; and
to prevent outgoing communications from leaving the communications account, the computer program further comprises instructions for causing a computer to prevent outgoing communications from leaving the communications account differently based on whether the aggregate measure surpasses the first threshold or the second threshold.

80. The medium of claim 68 wherein to determine whether the communications account is being operated by a spammer based on comparing the aggregate measure, the computer program further comprises instructions for causing a computer to input the communications account characteristics or data indicative of the existence of certain attributes in the communications account characteristics into a spam filter to be considered as features of a message from the communications account.

* * * * *